United States Patent
Andrews et al.

(10) Patent No.: US 12,509,641 B1
(45) Date of Patent: Dec. 30, 2025

(54) METHOD FOR ELIMINATING OR REDUCING DETECTION OF ARTICLES USING A SURFACE TREATMENT

(71) Applicant: Texas Raised Hunting Products LLC, Richmond, TX (US)

(72) Inventors: Brett Anthony Andrews, Richmond, TX (US); Brad Calhoun, Frankfort, OH (US); Bryan Allen Davis, Keller, TX (US)

(73) Assignee: TEXAS RAISED HUNTING PRODUCTS LLC, Richmond, TX (US)

( * ) Notice: Subject to any disclaimer, the term of this patent is extended or adjusted under 35 U.S.C. 154(b) by 303 days.

(21) Appl. No.: 18/238,506

(22) Filed: Aug. 27, 2023

(51) Int. Cl.
| | | |
|---|---|---|
| C11D 3/00 | (2006.01) | |
| A61K 8/22 | (2006.01) | |
| A61K 8/26 | (2006.01) | |
| C11D 3/12 | (2006.01) | |
| F41H 3/00 | (2006.01) | |

(52) U.S. Cl.
CPC ............ *C11D 3/0005* (2013.01); *A61K 8/22* (2013.01); *A61K 8/26* (2013.01); *C11D 3/128* (2013.01); *F41H 3/00* (2013.01); *A61K 2800/651* (2013.01); *C11D 2111/12* (2024.01)

(58) Field of Classification Search
CPC ... C11D 3/0005; C11D 3/128; C11D 2111/12; A61K 8/22; A61K 8/26; A61K 2800/651; F41H 3/00
USPC ........................................................ 510/408
See application file for complete search history.

(56) References Cited

U.S. PATENT DOCUMENTS

| | | | |
|---|---|---|---|
| 5,827,507 A | 10/1998 | Oshima et al. | |
| 11,365,372 B1 * | 6/2022 | Calhoun | C11D 3/128 |
| 2007/0226868 A1 | 10/2007 | Hunt | |

* cited by examiner

*Primary Examiner* — Eisa B Elhilo
(74) *Attorney, Agent, or Firm* — Technology Law PLLC; Karen L Kimble

(57) ABSTRACT

A method for reducing, eliminating or masking detection of an object such as an article, human or animal from IR, RF, X-ray, UV or EMI by using a composition having as ingredients silver water, zeolite, activated carbon and ozone and optionally sodium bicarbonate and copper. The method can use the composition as a concentrate or diluted with water for various applications, such as a powder, spray, wipes, liquid, and dunking use. It can be used as an additive in soaps, detergents, hand sanitizers, paints, coatings, and applied to any article that is coated with it such as buildings, equipment, persons, military uses and more. When applied to a person or animal, the heat signature of the person or animal is blocked from detection.

19 Claims, 14 Drawing Sheets
(14 of 14 Drawing Sheet(s) Filed in Color)

METHOD FOR ELIMINATING OR REDUCING DETECTION OF ARTICLES USING A SURFACE TREATMENT

FIELD OF THE INVENTION

This invention relates to reducing, eliminating or masking detection by IR (infrared), RF (radiofrequency), X-ray, UV (ultraviolet) or EMI (electromagnetic interference) of any objects to which it is applied. Such objects, include but are not limited to inanimate objects, animals (alive or their skins), and humans.

BACKGROUND OF THE INVENTION

Description of Related Art

Prior attempts at reducing detection of humans has been tried for many reasons. One example is in hunting game. Hunters are always trying to find their quarry, often deer, elk, hog or other land animals, desired as game. Many techniques have been tried to avoid detection of the hunter by the game. Most of these methods are marginally useful at best, in part because the animals have a keen sense of smell and hearing and can tell when the odor or sounds of a human are near. This smell or noise makes them nervous and they will avoid the areas that they may otherwise have occupied. This hunting issue detection is for smell and sound.

Many techniques and devices have been tried to eliminate or mask human odors from hunters in order to increase their ability to find their game animals. Some examples are found in: U.S. Pat. No. 7,328,789, issued Feb. 12, 2008; U.S. Pat. No. 8,066,939, issued Nov. 29, 2011; U.S. Pat. No. 8,257,648, issued Sep. 4, 2012; US Pub. Patent Appln. 2014/0178255, published Jun. 26, 2014; US Pub. Patent Appln. 2017/0142958, published May 25, 2017; and US Pub. Patent Appln. 2018/0010071, published Jan. 11, 2018. All of these references concern hunting issues for smell or sound detection of a hunter by the game animal. These references have provided at best a partial solution to this hunting problem.

However, this issue on scent detection led the present Applicant to obtain U.S. Pat. No. 11,365,372, issued Jun. 21, 2022, which is incorporated by reference. This is the best way Applicant knows to eliminate human scent for hunting. It discloses a composition that has been very effective for hunters.

No art concerning the ability to decrease or eliminate the problems for detection of objects, including humans, from IR, RF, X-ray, UV or EMI in a simple manner using a liquid or powder composition are known.

Clearly, finding a way to more easily eliminate, reduce or mask detection by IR, RF, X-ray, UV or EMI of objects for any purpose that is reproducible, available in sufficient quantities, and at low cost, while not having to carry devices that restrict movement or produce sounds, is desired. This invention provides such a method for reducing, eliminating or masking detection of many objects by IR, RF, X-ray, UV or EMI (electromagnetic interference) to which it is applied. Such objects include but are not limited to inanimate objects, animals (alive or their skins), and humans.

BRIEF DESCRIPTION OF THE INVENTION

This invention provides a method for eliminating, reducing or masking detection by IR, RF, X-ray, UV or EMI of an object by application of a present composition to the clothing or surface of such object desired for such effect. This method capability for scent removal or reduction is of value in hunting applications as claimed in the Applicants' prior patent (U.S. Pat. No. 11,365,372), surprisingly it has now been found to have much wider applications, especially when using an improved composition. Namely, this prior composition and now also the improved composition when applied to an object enables eliminating, reducing or masking detection by IR, RF, X-ray, UV or EMI. This was unexpected from a liquid or powder applied to such object.

The present method, using the prior composition or the present improved composition, can be used for many purposes where such eliminating, reducing or masking detection by IR, RF, X-ray, UV or EMI of an object is desired. Such objects include, but are not limited to: inanimate objects such as building emissions, structures, tents, blinds, electronic devices, military equipment such as guns, trucks, planes, backpacks, etc.; animals such as the animal skins, game animals, tracking dogs, etc.; and humans including anything in contact with the human such as clothing, guns, goggles, hand held devices, electronic devices, etc. and eliminates scent detection by tracking animals, and heat detection from the human or animal. Thus, any object where such method is desired can have this composition applied, usually in the form of a powder, or liquid as a concentrate, spray or dipped in the liquid.

The present method comprises a composition as a concentrate that has as ingredients:
- a) about 1 gallon (3.8 L) silver water or copper/silver water concentrated at 110 ppm to 150 ppm of silver
- b) about 2 to about 7 tbsp. (34-119 g) of zeolite (the finest grind available)
- c) about 1 to about 5 tsp. (5-25 g) of activated carbon,
- d) optionally, from about 30 lbs. to about 75 lbs. (13.6-34 Kg) sodium bicarbonate; and
- e) ozone;

which treatment eliminates, reduces or masks detection of the article, human or animal by IR, RF, X-ray, UV or EMI.

A preferred composition has the following components:
- a) about 1 gallon (3.8 L) silver water concentrate having at least 110 ppm of silver or about 1 gallon of copper/silver water concentrate having at least 110 ppm of silver and 110 ppm of copper;
- b) about 4 tbsp. (60 g) of zeolite;
- c) about 2 tsp. (8 g) activated carbon;
- d) about 50 lbs. (22.7 Kg) sodium bicarbonate; and
- e) ozone, which composition is applied to the object, optionally with an aqueous base material present, using known means as a powder, spray or liquid to coat the object in whole or in part thereby eliminating, reducing or masking detection of the coated object by at least one or more of IR, RF, X-ray, UV and EMI.

The improved composition of this invention comprises as a concentrate that has ingredients:
- About 1 gallon (3.8 L) of copper/silver water concentrated at 110 ppm to 150 ppm, with 110 ppm preferred of both copper and silver;
- About from 30 lbs. to 75 lbs. sodium bicarbonate, with about 50 lbs. (22.7 Kg) preferred (optional);
- About 2 to about 7 tbsp. of zeolite (the finest grind available), preferred 4 tbsp. (60 g);
- About 1 to 5 tsp. of activated carbon, preferred 2 tsp. (8 g); and Ozone.

This process for the improved composition is provided in Examples A 2 and 4-6.

Either of these compositions may be used in the present method. However, the improved composition having copper present is preferred. When making the copper/silver water starting material, 4 oz. of the prior concentrate of Example 4 as a powder is added to the composition of Example 4 prior to ozone being added. The generator run for about 24 hours, then, the ozone is added and the generator run for 25 minutes. This provides the improved composition.

These composition components may be scaled up or down so long as the relative ratios of each component in the total composition are maintained. The amounts of each component above can be varied by about +10% from the stated amounts. The ingredients are selected within the stated ranges above to equal 100% by wt. of the final concentrate.

The process makes the silver water or copper/silver water, as described herein and in Example A. the zeolite and activated carbon are added to the silver water or copper/silver water. The resulting solution is treated for at least 25 minutes to 48 hours with ozone. Then, a dry powder is prepared when the sodium bicarbonate is added to the composition and mixed until dry. The ozone reacts with these components to make a composition and also makes the composition sterile. The final composition with the sodium bicarbonate is a dry powder which can be bottled or put into any container. The liquid composition concentrate is made by taking 4 oz. of the dry power concentrate and adding 1 g of warm water (85-95° F.) to it, then reacting with ozone for 25 minutes. Thus, large batches can be made or individual amounts to carry or apply as either a powder or liquid and used in the present method.

The present powder concentrate of about 2 to 6 oz., preferred 4 oz., can be diluted with about 128 oz. of water to make a liquid or spray or put into a wipe that is moist for application. Also, if a concentrated liquid is desired in place of the dry powder, then the sodium bicarbonate can be omitted from the composition.

The present compositions can be used in many ways to also eliminate human odors as well as the elimination of the IR, IF, X-ray, UV and EMI, including but not limited to products that coat the object by using in a laundry detergent, bar soap, liquid concentrate, which treats clothes worn by the person both by laundry of the items and then applying later. This composition can even be used to wash down or coat any article such as equipment, including but not limited to gun cases, arrow quivers, tents, blinds, tree stands, or any desired object. This composition as used in this method also eliminates, reduces or masks detection by IR, RF, X-ray, UV or EMI. Additionally, when used in a battery as the battery fluid, it will retain the charge at near 100% for many months or years.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
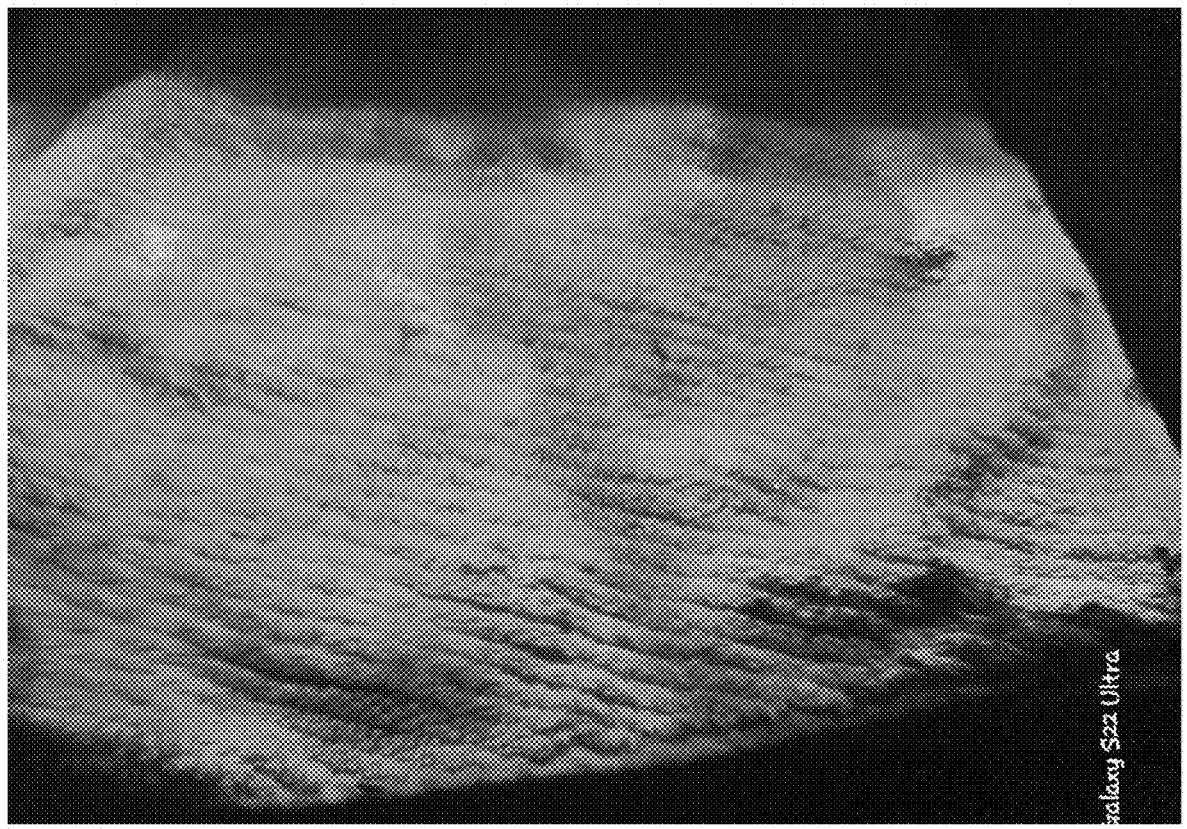
FIG. 1 is a photograph using UV of a towel prior to washing or treatment with a composition of this invention-control

It is understood that the terminology used herein is for the purpose of describing particular embodiments only and is not intended to be limiting. As used in this specification, the singular forms "a", "an", and "the" include plural referents unless the content clearly indicates otherwise. The following terms in the Glossary as used in this application are to be defined as stated below and for these terms, the singular includes the plural.

Various headings are present to aid the reader, but are not the exclusive location of all aspects of that referenced subject matter and are not to be construed as limiting the location of such discussion.

Also, certain US patents and published applications have been incorporated by reference. However, the text of such patents is only incorporated by reference to the extent that no conflict exists between such text and other statements set forth herein. In the event of such conflict, then any such conflicting text in such incorporated by reference US patent or published application is specifically not so incorporated in this patent.

Glossary

Animal means any non-human animal that needs to have its presence decreased for being detected, especially trained dogs. Also, making the article or human treated with this composition so that an animal cannot detect the presence of such human or article.

Copper means copper metal, brass, phosphorous bronze, or beryllium copper or mixtures thereof DI water means distilled water that tests at 0 ppm for silver EMF means electromagnetic fields, including electric fields (E-Fields)

EMI means electromagnetic interference, including EMF g means gram
IR means infrared and includes heat emissions
Kg means kilogram
L means liter
lbs. mean pounds Object means, but is not limited to, inanimate objects, animals (alive or their skins), and humans for any object where the elimination, reduction or masking of detection by IR, RF, X-ray, UV or EMI is desired. This includes but is not limited to any equipment that can be treated with the composition such as buildings where humans may be inside, storage buildings, heat emissions from humans or animals, tents, military vehicles, planes, all-terrain vehicles, guns, military equipment, electronic devices, rockets, space stations, or satellites.

oz. means ounce
pm means picometer
ppm means parts per million
RF means radiofrequency
tbsp. means tablespoon
tsp. means teaspoon
UV means ultraviolet Although the present components are used within ranges to provide the formulation, the use of ozone reacts with these components and forms a composition. While not wishing to be bound by theory, it is believed that the components of this formulation are chemically reacted with the ozone, thereby forming a distinct product that provides the desired properties. The precise chemical structure of this composition has not yet been determined.

The process starts by immersing silver rods in DI water (1 gallon) in a colloidal silver generating kit. The silver rods or the copper/silver rods and DI water are treated for about 24 hours prior to use at about 27 volts. The silver is colloidal in the DI water. The amount of silver in the DI water is at least 110 ppm. The amount of copper is 110 ppm. If needed, such process is continued until the amount of silver meets or exceeds 110 ppm and can be greater. It is not for human consumption. This ingredient is referred to herein as "silver water" as in Example A 1 or "copper/silver water" in Example A 2. When the "copper/silver water" is prepared, then this process is modified by having silver and copper added at the same time (where the copper is the anode and the silver is the cathode) and the same process is run as for the silver water.

For either the silver water or the copper/silver water the following process is done: 4 g of Zeolite and 2 g of activated carbon are mixed together. The mixture is then added to 1 gallon of silver water or copper/silver water as prepared above. The mixture is then treated 25 minutes with ozone, but can be treated for 48 hours if desired, to form the composition. The resulting solution often is then combined with 50 lbs. (22.68 Kg) of sodium bicarbonate and mixed until dry. The sodium bicarbonate is omitted if the base material is acidic (pH 4-6) as the composition would foam. The process with the sodium bicarbonate makes the dry, powder mixture concentrate. Then 4 oz. of this dry powder concentrate is placed into a gallon container and 1 gallon of warm (85-95° F.) DI water added with mixing. Ozone is then bubbled through the mixture for 25 minutes to obtain the liquid concentrate used in this present method. A modification of this process is to take about 4 oz. of the silver water or copper/silver water liquid concentrate formed and add it to the starting reaction mixture prior to running the ozone generator, then add the ozone and run the generator for about 25 minutes.

If large batches are desired, the process can be scaled up or multiple batches run so long as amounts of the components in the composition varies by about ±10% by wt. and the relative ratios of each component to the other components remain constant within any variation.

The dry formulation or the liquid can be used to make various products to eliminate, reduce or mask detection by IR, IF, X-ray, UV or EMI of humans. For example, the present method can be applied in any manner, such as spraying, coating, dipping or other means to the article or human desired. It can also be applied to animals so they are not detected. Some products include but are not limited to body and hair wash products, bar soap, laundry detergent, lotion, hand sanitizer, and other similar products, sprays or liquid used on the skin, where the purpose is to apply this composition to all exposed parts of the person or animal. Thus, outer clothing, including but not limited to uniforms, shoes, boots, socks, hats, gloves, equipment being carried by the person, and also to all exposed skin on the head, hands, feet should be done with this method for eliminating, reducing or masking human detection by IR, RF, X-ray, UV or EMI. These concentrates can be added to an aqueous base material for application for this method. For example, the concentrate can be added to a latex paint to coat objects that are inanimate, there are many other such aqueous base materials. The method of application can be any method that can coat the object as evenly as possible for maximizing the results.

Such treatment by this present method can be applied by many methods such as drones spraying or coating an article with a powder or liquid of this composition; dipping an object into a liquid of this composition, coating an article with this composition using conventional means such a powder coating or spraying or immersion in a bath. This application method can be done by adding the composition into a water based paint or any polymer or base substance like a body wash, and then applied to the object. The result being that the surface that is exposed to possible detection is coated by the present composition. The more evenly applied or complete the coating by the present composition, the more effective the results obtained. However, if the base component to which the present composition is to be added is acidic (such as having a pH about 4-6.5, then the $NaHCO_3$ is not added to the present composition to avoid reactions such as foaming. To aid in the coating process, an aqueous base material may be used such as a latex paint, water to dilute the concentrate, etc.

The present method using this composition can result in articles or persons being able to avoid or minimize detection, including but not limited to heat seeking devices because it blocks heat signatures, IR guided drones, viewing from a distance into buildings using IR or X-ray, blocking detection by RF or EMI, and avoiding detection by UV. Some of the possible uses intended include hunting, fishing, wildlife management, photography of nature, animals, especially those for tracking game or persons, cell phone transmissions, chemical plants, industrial buildings and roofs, solar panels, electrical boxes and transformers, or many military uses such as buildings, military vehicles such as submarines, submersibles, rotary and fixed wing aircraft, ships, all items at a military site such as rocket, launchers, guns, vehicles, clothing and articles worn by personnel, and various applications were detection is not desired.

Although the composition of Example 1 is described in U.S. Pat. No. 11,365,372 by this Applicant, scent detection is a very different mechanism for having an effect on a person or equipment than the present methods. The present inventors were not trying to obtain the results now found and were very surprised that any liquid composition could provide such effects and they were not expecting such methods to be possible as they know of no available liquid spray or use for these presently claimed methods. Once a liquid having some effect for the present method was unexpectedly found (Example 2), then maximizing those effects were done (Examples 4-6).

Although a composition of Example 1 or 2 can used for many of these tests with satisfactory results, a composition of Example 4 or 5 was used to attain even better results.

This invention will be further clarified by a consideration of the following examples which provides the preparation of compositions of this invention and starting materials (Examples A-C), with Example C to the improved composition now claimed and Examples 1-9 to the present method, which examples are intended to be purely exemplary of the present invention.

Materials used in these examples are as follows:

Activated charcoal powder means food grade and finely ground. It is derived from Lab Alley, Bulk herbs and wholesale foods and is 100% Percent Purity with PH neutral at 6.20.Borax is from Henkel Corporation as the 20 mule team borax brand DI water is distilled water that tests at 0 ppm for silver Lard is purchased in food stores from the Morrell company Lye (NaOH) is from Santeen company Ozone generator—Sterhen model A-181

Silver generator-Original Silver Generator from The Silver Lining Company as a kit with silver rods that are 12 gauge wire, 99.9% pure that makes colloidal silver; or Kaime Naturals silver rods, or a prepared colloidal silver water, from Naturally Sourced. The rods are 6 in.×⅛ in. and can be rectangular or tapered or shaped.

Copper rods are purchased from eBay or Amazon, or from Tynulox. These rods are 99% pure copper, best if tapered on one end, 7 in.×⅛ in. and forms colloidal copper.

Sodium bicarbonate ($NHCO_3$) from FP&S Company (Food Products and Services Company) of animal feed grade with 27% sodium Zeolite Clinoptilolite™ from the KMI Zeolite Company as 97% Purity and 3.0 pH Neutral activated ultrafine micronized ground powder, 100-MESH (99%) passing average particle size 0.052 mm, Pharmaceutical Grade.

Example A: Preparation Starting Material

Silver Water

Silver water is made by immersing silver rods in DI water in a colloidal silver generating kit. The silver and DI water are treated for 24 hours prior to use at about 27 volts. The silver is colloidal in the DI water. The amount of silver in the DI water is at least 110 ppm. It is not for human consumption.

Copper/Silver Water

Copper/silver water is made by immersing silver rods (as the cathode) and copper rods (as the anode) in DI water in a colloidal silver generating kit. The silver and copper and DI water are treated for 24 hours prior to use at about 27 volts. The silver is colloidal in the DI water. The amount of silver in the DI water is at least 110 ppm and the copper is at least 110 ppm. It is not for human consumption.

Example 1: Preparation of a Concentrate Composition Using Ag and Activated Carbon as Electrodes The Zeolite (4 tbsp; 60 g) and activated carbon (2 tsp; 8 g) are mixed. The mixture is then added to 1 gallon (3.79 L) of silver water (prepared by Example A 1). The mixture is then treated 25 minutes with ozone, where the ozone reacts with the other components to form the composition. The resulting solution is then combined with 50 lbs. (22.7 Kg) of sodium bicarbonate and mixed until dry. The process makes about 50 lbs. (22.7 Kg) of the dry mixture concentrate. This is the powder composition used in the present method.

Example 2: Preparation of the Liquid Composition Concentrate

To a gallon container to added 4 oz. of the powder from Example 1. DI water (1 gallon) at 85-95° C. is added to the gallon container having the powder. The liquid is mixed and reacted with ozone for 25 min. This forms the liquid composition concentrate used in the present method. When desired, this liquid can be added to other base materials to be applied in the present method.

Example 3: Additive for Example 1

To make another batch of the powder or liquid of the present composition, prior to running the ozone generator, 4 oz. of this powder concentrate from Example 1 is added to the silver water in Example 1 and the process of Example 1 repeated, optionally then repeating Example 2. This addition of the concentrate liquid at the start of the repeat process provides ions to better facilitate the ion exchange reaction with zeolite, metal ions and ozone, which also increases the ppm level of the ions. Also, the heat being put off by the rods increases the release more ions during this process.

Example 4: Preparation of a Concentrate Composition Using Ag and Cu as the Electrodes The Zeolite (4 tbsp; 60 g) and activated carbon (2 tsp; 8 g) are mixed. The mixture is then added to 1 gallon (3.79 L) of copper/silver water (prepared by Example A 2). The mixture is then treated 25 minutes with ozone, where the ozone reacts with the other components to form the composition. The resulting solution is then combined with 50 lbs. (22.7 Kg) of sodium bicarbonate and mixed until dry. The process makes about 50 lbs. (22.7 Kg) of the dry mixture concentrate. This is the powder composition used in the present method.

Example 5: Preparation of the Liquid Composition Concentrate Having Cu and Ag To a gallon container to added 4 oz. of the powder from Example 4. DI water (1 gallon) at 85-95° C. is added to the gallon container having the powder. The liquid is mixed and reacted with ozone for 25 min. This forms the liquid composition concentrate used in the present method. When desired, this liquid can be added to other base materials to be applied in the present method.

Example 6: Additive for Example 4

To make another batch of the powder or liquid of the present composition, prior to running the ozone generator, 4 oz. of this powder concentrate from Example 4 is added to the copper/silver water in Example 4 and the process of Example 4 repeated, optionally followed by repeating Example 5. This addition of the concentrate liquid at the start of the repeat process provides ions to better facilitate the ion exchange reaction with zeolite, Cu ions and Ag ions and ozone, which also increases the ppm level of the ions. Also, the heat being put off by the rods increases the release more ions during this process.

Example 7: Laundry Detergent

The concentrate from Example 5 is mixed in equal parts by weight with Borax. This is a dry mix with the amount determined by the amount of the two ingredients. It is used in standard washing machines for treating clothing to be worn to avoid or minimize detection.

Example 8: Bar Soap

Lye (NaOH) (4.25 oz.; 120.5 g) is added to 12 oz. (12 mL) of DI in a stainless-steel container. Lard (32 oz.; 907 g) is melted and added to the lye with an immersion blender slowly. Then 4 oz. (113.4 g) of the concentrate from Example 5 is added to the mixture and stirred until well blended. The mixture is poured into 4 oz. bar molds. The batch makes about 32 bars to be used on the skin to avoid or minimize detection.

Example 9: Body Wash

Combine 4 tsp. (16 g) of zeolite with 1 tsp. (4 g) of activated carbon and add to 16 oz. (454 g) of copper/silver water (prepared by Example A 2) and mix thoroughly. No $NaHCO_3$ is used. Add this mixture to 1 gallon (3.79 L) of unscented body wash base with an immersion blender. Yields about 144 oz. (4.26 L) of body wash to be used to avoid or minimize detection.

Example 10: Clothing Detection Barrier

Mix thoroughly 2 tsp. (8 g) of activated carbon, 1 tsp. (4 g) of zeolite and 10 lbs. (4.5 Kg) of concentrate from Example 5. This makes about 10 lbs. (4.5 Kg) of dry mixture. The resulting product is mixed with water and the clothes are immersed in this solution and allowed to air dry to avoid or minimize detection.

Example 11: UV Test

To show if the present composition blocks detection by UV, the following tests were done. The test was run using a light source to reveal optical brighteners 350 BLB fluorescent/Led black light.

Figure 2:
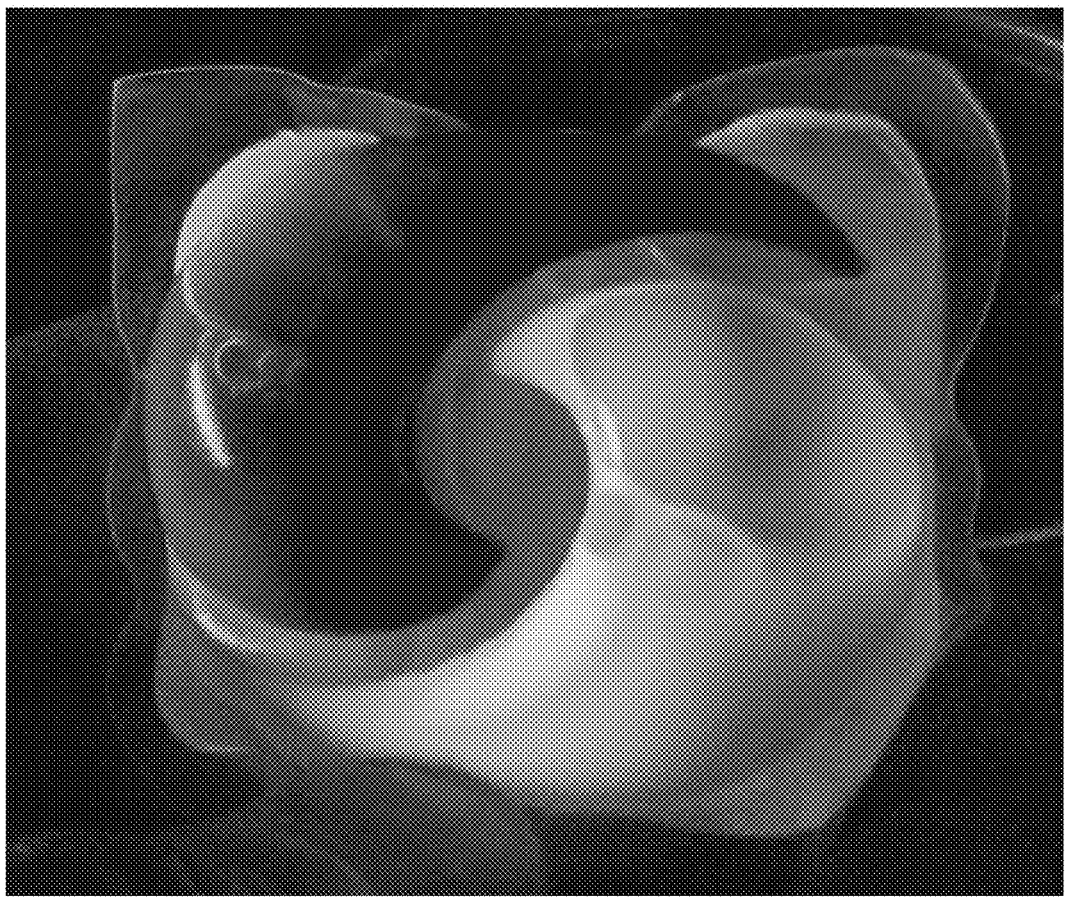
FIG. 2 is a photograph using UV of a Tide pod showing the brighteners present in the pod
Figure 3:
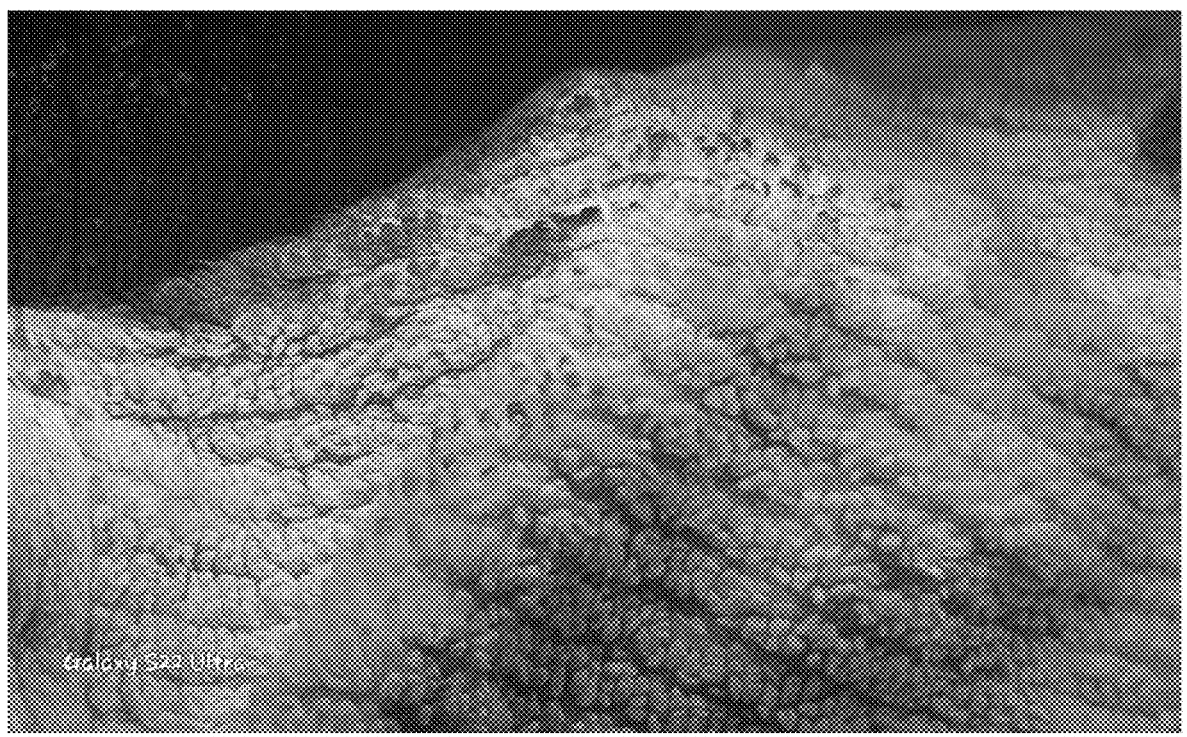
FIG. 3 is a photograph of the towel using UV after washing in Tide showing the yellow and purple brighteners on the towel
Figure 4:
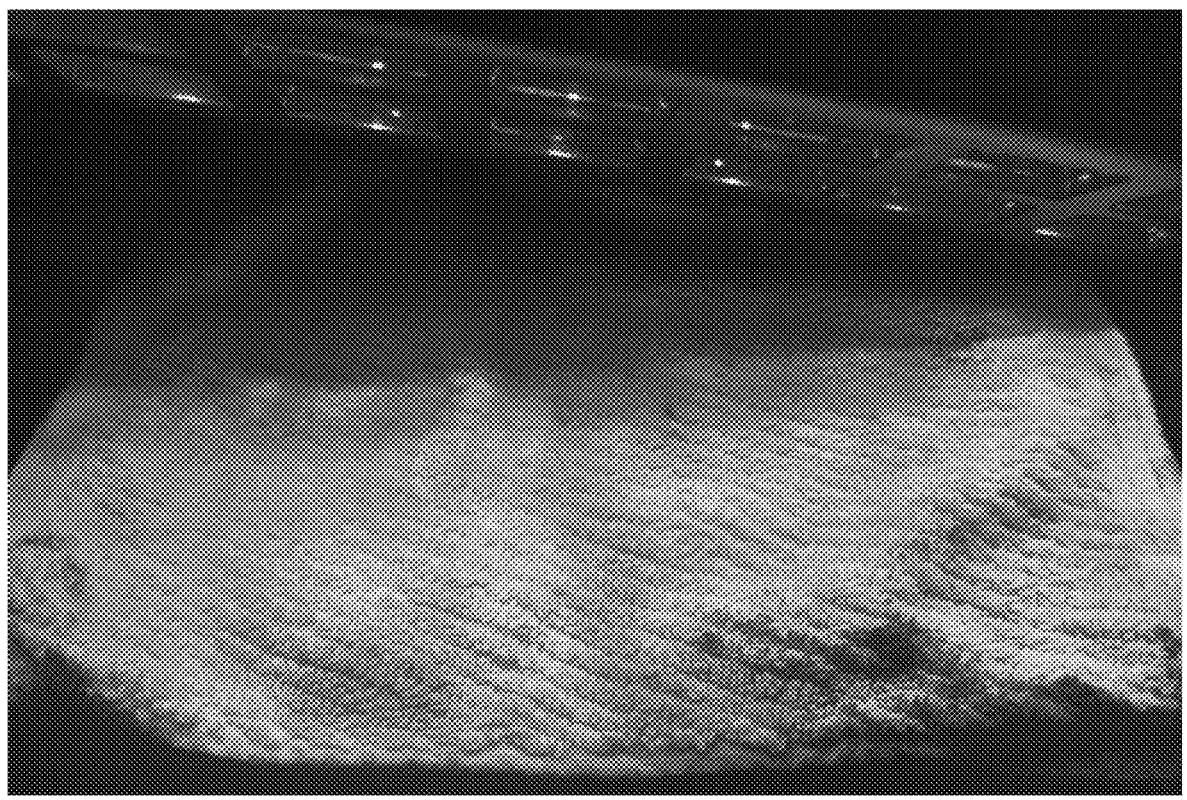
FIG. 4 is a photograph of the towel using UV after treatment with the composition of this invention and then washing in Tide
Figure 5:
FIG. 5 is a photograph of the towel using UV after washing with Tide and then treatment with a composition of this invention

The control photographs showing UV images of the towels (FIG. 1) and the Tide pods (FIG. 2) used. The towels were then washed in the Tide and tested by UV again (FIG. 3). The Tide Pods as sold have a purple and yellow dye present. After the hand towels were washed, they were placed with the towel submerged in the composition of Example 5 for about 20 minutes. Thereafter, a black light (Galaxy 22 Ultra UV light) was used to see what happened. The images (FIG. 5) appeared as though the towels had been soaking in bleach as they were extremely white having no purple or yellow dye in the towel where the composition had been present.

Figure 6:
FIG. 6 is a photograph of the towel using UV after washing with Tide and then treatment with a composition of this invention FIGS. 7A & B are photographs using IR of a person wearing a hunting suit outdoors where 7A is the front of the person and 7B is the back of the person-control FIGS. 8A & B are photographs using IR of a person wearing a hunting suit outdoors after applying the present composition where 8A is the front of the person and 8B is the back of the person; the person's face and feet were not treated with the composition FIGS. 9A & B are photographs using IR of a person outdoors wearing a hunting suit after 10 minutes from applying the present composition where 9A is the front of the person and 9B is the back of the person; the person's face and feet were not treated with the composition FIGS. 10A & B are photographs using IR of a person wearing a hunting suit indoors after applying the present composition where 10A is the front of the person and 10B is the back of the person; the person's face and feet were not treated with the composition

Surprisingly, if you apply the composition first to the towel, then wash it with Tide to see if the composition is removed by the washing of the towel, the white areas from the composition remains and was not removed by the washing. Additionally, no purple or yellow dye was found from the Tide in the treated towel. Thus, the composition appears to bind to the fabric after treatment and is not removed by washing. (FIG. 6)

Furthermore, when the towel is sprayed either before or after washing in a detergent having brighteners (e.g., Gain pods or Tide pods) reduced brighteners showed on the towel using the UV light indicating the UV was blocked.

Example 12: IR Blocking

It has been found that the present composition, when applied to a human, blocks both the heat signature from the person and lowers the temperature, often about 10-20° F. This testing is a qualitative IR thermographic survey using 8000-14000 nanometers (TELEDYNE FLIR Dual Thermal Imaging Camera). The results were confirmed with IR thermograms as shown in the FIGS. 7-10. The person's heat emission is blocked.

Figure 7A:
Figure 7B:
Figure 8A:
Figure 8B:
Figure 9A:
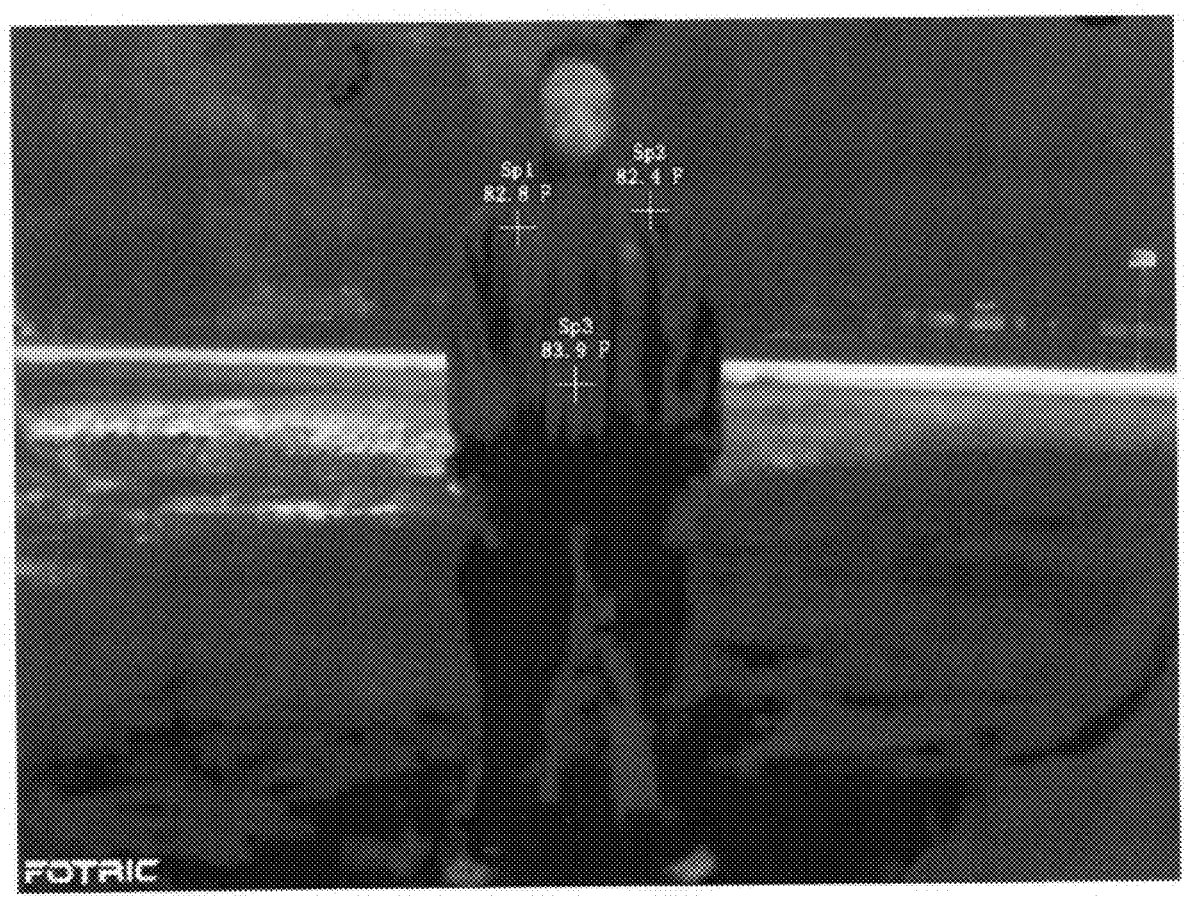
Figure 9B:
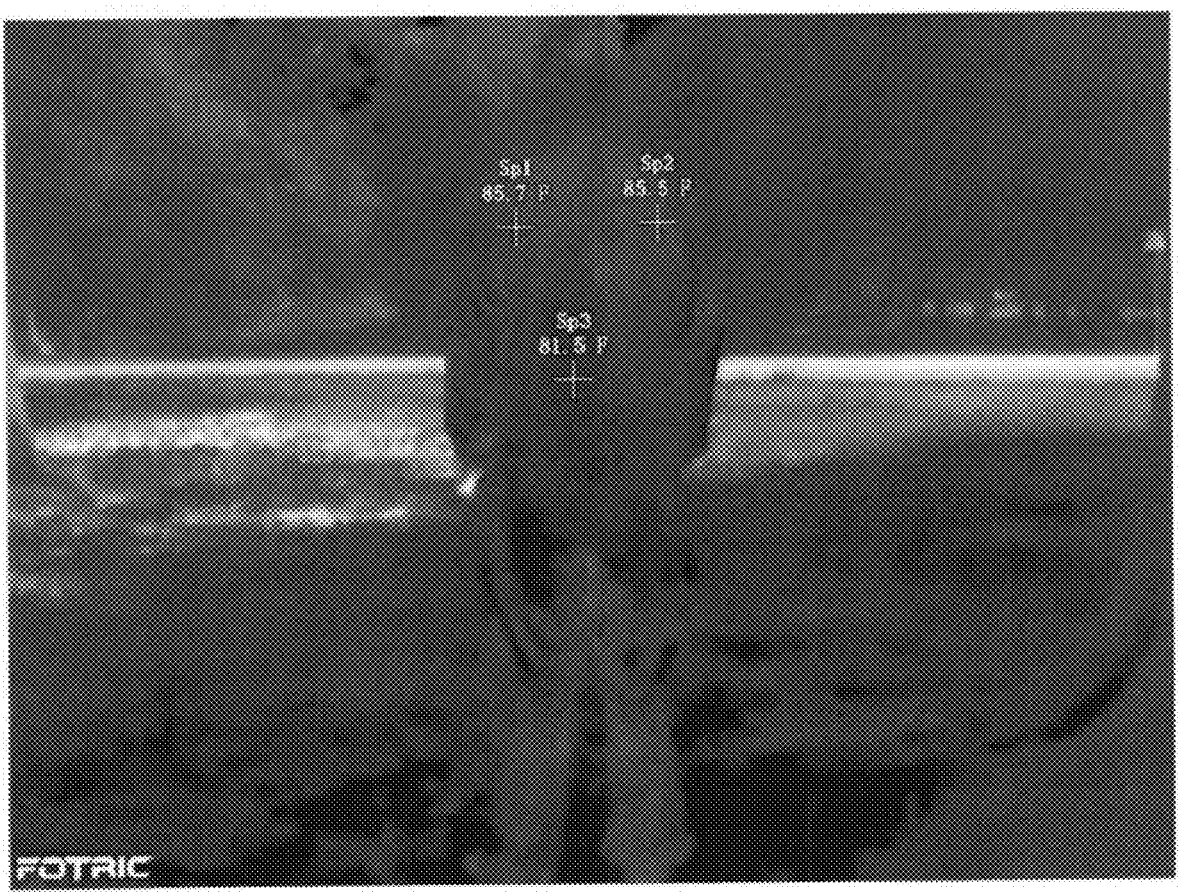
Figure 10A:
Figure 10B:

Controls were taken with a camouflage full body suit (Savanna by Scent Lok) outdoors. Heat signatures were apparent from the entire body as no IR was retained or reflected from the body suit (FIGS. 7A & 7B). After spraying the suit with the composition of Example 5 and taking images minutes later, where the only heat signature images were from the face and feet of the person where the composition had not been applied and other objects present in the field of measurement up to hundreds of yards behind the person, there were no heat signatures from the person showing (FIGS. 8A & 8B). The IR blocking was retained and the body temperature dropped about 10° F. from the untreated body temperature reading after 10 minutes treatment with the composition (FIGS. 9A & 9B).

The images were then done indoors (FIGS. 10A & 10B) where the only heat signature images were from the face and feet of the person where the composition had not been applied. The IR blocking was evident and the body temperature dropped about 20° F. from the initial temperature.

These results for blocking IR from a water-based spray on composition have not been seen before as usually IR blocking agents are special paints, metal, glass or concrete walls.

Example 13: EMF, E-Fields and RF Use Outdoors

The copper and silver composition (Example 5) was designed for using for EMF, E-Fields and RF blocking. Copper is highly effective at blocking MRI/X-ray, EMI, RF, IR and UV. Silver is second. This composition of Example 5 increases the ion exchange desired for this use. A Narda Selective Radiation Meter SRM-3006 with an isotropic antenna was used to ascertain the frequency and spectrum present and to assess the power density or field strength levels at the site. This instrument allows measurements in the frequency range from 26 MHz to 6,000 MHz. Calibration was done by manufacturer instructions.

The RF readings were conducted at 1 foot, 3 feet, 6 feet and 9 feet with the generator operating at 1920-1930 MHz. Controls were run with the composition and without the composition to test the shielding capability. Results are reported in microWatts per square meter ($\mu W/m^2$). The following Table 1 shows these results.

TABLE 1

| Material | RF ($\mu W/m^2$) | | | |
| --- | --- | --- | --- | --- |
| | 1 ft | 3 ft | 6 ft | 9 ft |
| Baseline—control | Max = 119,800 Avg = 903.3 | Max = 10,200 Avg = 82.4 | Max = 2,461 Avg = 18.7 | Max = 1,313 Avg = 8.2 |

TABLE 1-continued

| Material | RF (µW/m²) | | | |
|---|---|---|---|---|
| | 1 ft | 3 ft | 6 ft | 9 ft |
| Cardboard Box | Max = 118,300 Avg = 864.7 | Max = 10,180 Avg = 70.7 | Max = 2,422 Avg = 15.0 | Max = 1,185 Avg = 7.3 |
| Cardboard Box & Composition | Max = 73,470 Avg = 575.7 | Max = 6,945 Avg = 54.5 | Max = 1,691 Avg = 13.2 | Max = 999.1 Avg = 5.7 |
| T-Shirt | Max = 116,000 Avg = 830.5 | Max = 9,860 Avg = 61.6 | Max = 1,890 Avg = 13.1 | Max = 1,472 Avg = 10.08 |
| T-Shirt & composition | Max = 67.380 Avg = 488.4 | Max = 8,510 Avg = 48.7 | Max = 1,640 Avg = 12.0 | Max = 1,101 Avg = 7.0 |
| Nylon Hunting Jacket | Max = 108,500 Avg = 885.9 | Max = 8,054 Avg = 65.2 | Max = 1,786 Avg = 11.6 | Max = 1,308 Avg = 6.3 |
| Nylon Hunting Jacket & composition | Max = 86,100 Avg = 742.3 | Max = 6,920 Avg = 51.4 | Max = 1,652 Avg = 10.6 | Max = 805.4 Avg = 5.4 |
| Cotton Hunting Jacket | Max = 117,800 Avg = 865.4 | Max = 7,915 Avg = 51.4 | Max = 1,829 Avg = 11.8 | Max = 1,269 Avg = 8.8 |
| Cotton Hunting Jacket & composition | Max = 89,100 Avg = 776.5 | Max = 6,385 Avg = 39.3 | Max = 1,673 Avg = 11.2 | Max = 1,018 Avg = 6.6 |
| ScentLok Hunting Jacket | Max = 106,900 Avg = 815.7 | Max = 7,908 Avg = 64.6 | Max = 1,853 Avg = 11.0 | Max = 1,118 Avg = 7.8 |
| ScentLok Hunting Jacket & composition | Max = 74,800 Avg = 555.9 | Max = 7,349 Avg = 57.5 | Max = 1,586 Avg = 10.5 | Max = 782.4 Avg = 5.4 |

RF results in Table 1 indicate that the composition of this method shielded RF across all measurement points. The composition was applied as a water-based spray. This was surprising because usual RF shielding materials consist of specialized liquid paint coatings, wire meshes, and foils.

To further illustrate this RF feature of the present composition of Example 5, in early October of 2021 (prior to the deer rifle season in the fall) a hunter applied the composition of Example 5 to the inside of 8 fiberglass hunting blinds. The application method was simply using the 24 oz spray bottle and applying it to walls, ceiling, and floor. Later in early November when at the ranch hunting after the deer rifle season opener, the hunter realized that when sitting in the blinds where the composition had been applied, he I could no longer get a cell signal on his cell phone. For years those hunters who were hunting together would communicate with each other via group text messages. For example, they would text everyone that we made it safely to our blind, or that we were leaving the blind after a hunt to head back to camp. The property on which they hunt is very large and for safety reasons they all keep tabs on each other via group text message. So not being able to get a cell signal while inside the blind was a little worrisome. However, if he held his cell phone outside of the window of the blind, he could get a signal and check and send texts, but as soon as he brought his phone into the blind, the signal was lost. Although initially he thought it may be a cell service issue at the ranch, however, he could normally get a good enough signal in these selected blind locations to communicate via text while sitting in the blind until he applied the present composition.

The longevity of this effect appears to be very long lasting. After discovering this effect in the fall of 2021, he discontinued spraying down the inside of the blinds for this hunting party. They would only spray themselves and their gear that they were taking into the blinds for scent control. By the 2022 deer rifle season (a year after initial application), his cell signals inside the blinds were still being affected. Where previous to the application of the present composition, they would get a strong signal in the blinds, now they were able to get only a weak signal. This was an unexpected result.

Low frequency alternating current (AC) electromagnetic fields (EMF) using a WaveControl SMP2 instrument were conducted with a tri-axial magnetic field meter to assess the magnetic flux density (EMF levels) in milligauss (mG) and the AC electric fields (E-Field) in volts per meter (V/m). The EMF and E-Fields readings were conducted at 1 foot, 3 feet, 6 feet and 9 feet with the generator operating at 60 Hz. Controls were run with the composition and without the composition to test the shielding capability. Calibration was done by manufacturer instructions. The following Table 2 shows these results.

TABLE 2

| Material | E = Field (V/m) | | | |
|---|---|---|---|---|
| | 1 ft | 3 ft | 6 ft | 9 ft |
| Baseline—control | Avg = 2.40 Min = 2.37 | Avg = 1.23 Min = 1.20 | Avg = 1.0 Min = 0.99 | Avg = 0.98 Min = 0.97 |
| Cardboard Box | Avg = 2.16 Min = 2.11 | Avg = 1.17 Min = 1.15 | Avg = 1.0 Min = 0.99 | Avg = 0.98 Min = 0.98 |
| Cardboard Box & composition | Avg = 0.98 Min = 0.97 | Avg = 0.98 Min = 0.97 | Avg = 0.98 Min = 0.97 | Avg = 0.98 Min = 0.97 |
| T-Shirt | Avg = 2.30 Min = 2.22 | Avg = 1.23 Min = 1.20 | Avg = 0.99 Min = 0.98 | Avg = 0.97 Min = 0.96 |
| T-Shirt & composition | Avg = 0.98 Min = 0.97 | Avg = 0.97 Min = 0.96 | Avg = 0.97 Min = 0.96 | Avg = 0.97 Min = 0.96 |
| Nylon Hunting Jacket | Avg = 2.35 Min = 2.3 | Avg = 1.16 Min = 1.14 | Avg = 1.0 Min = 0.99 | Avg = 0.98 Min = 0.98 |
| Nylon Hunting Jacket & composition | Avg = 1.0 Min = 0.98 | Avg = 0.99 Min = 0.98 | Avg = 0.99 Min = 0.98 | Avg = 0.98 Min = 0.98 |
| Cotton Hunting Jacket | Avg = 2.4 Min = 2.19 | Avg = 1.15 Min = 1.13 | Avg = 1.0 Min = 0.99 | Avg = 0.98 Min = 0.98 |
| Cotton Hunting Jacket & composition | Avg = 1.0 Min = 0.99 | Avg = 0.99 Min = 0.99 | Avg = 0.99 Min = 0.98 | Avg = 0.98 Min = 0.97 |
| ScentLok Hunting Jacket | Avg = 2.19 Min = 2.15 | Avg = 1.15 Min = 1.12 | Avg = 0.99 Min = 0.98 | Avg = 0.98 Min = 0.97 |
| ScentLok Hunting Jacket & composition | Avg = 0.98 Min = 0.97 | Avg = 0.99 Min = 0.99 | Avg = 0.99 Min = 0.98 | Avg = 0.98 Min = 0.97 |

The above E-Field results indicate that the composition of this method shielded EMF across all measurement points. The composition was applied as a water-based spray. This was surprising because usual EMF shielding materials consist of metal conduits, specialized liquid paint coatings, wire meshes, and foils.

EMF results do not appear to be shielded with the present composition. This is not too unexpected as EMF fields are not easily shielded.

Example 14: X-Ray Shielding

One of the present inventors had spray himself and his clothes with the composition of Example 5 prior to doing work on trail cameras outdoors. He fell and injured his arm and hand. Upon going to the emergency room to be checked by X-ray the technician could not get any images of his hand or arm. The composition totally blocked any images. He was asked to wash off whatever was on his skin. The X-ray was then able to be taken and he was treated.

Example 15: Battery Life

Take 32 oz. of mineral oil and 6 oz. of Example 4 as a powder and mix thoroughly. Then replace the battery acid and lithium ion cavities fluid in a 12-volt battery with this mineral oil/Example 4 composition and install the modified battery into a truck. Presently this battery has run for 3 months and 17 days without recharging and tests at 99% charged. It is still functioning. How long will it last and keep its charge is unknown, but depending if the battery is sitting outside (hot or cold) or somewhere warm like a garage, could affect its useful life. It may last a very long time.

While not wishing to be bound by theory, it is possible that the components together can make these ions and heat happen to produce the energy needed. Zeolite can store the energy and release it as needed and the composition serves as an ion exchange with the carbon, copper and silver ions. The components interaction of the properties of ionic silver, copper, active carbon, and sodium bicarbonate all produce ion exchanges. Zeolite also creates ions but also turns thermal heat into energy. The zeolite stores these components inside the cavities of the honey cone. It acts as a time release capsule or delivery system when loaded with other binders storing them and releasing when needed. In contrast to graphite, zeolite has no control of how much energy it makes.

Although the invention has been described with reference to its preferred embodiments, those of ordinary skill in the art may, upon reading and understanding this disclosure, appreciate changes and modifications which may be made which do not depart from the scope and spirit of the invention as described above or claimed hereafter. Accordingly, this description is to be construed as illustrative only and is for the purpose of teaching those skilled in the art the general manner of carrying out the invention.

What is claimed is:

1. A method for treating an object comprising applying to the object a composition which comprises the following components:
   a) about 1 gallon (3.8 L) copper/silver water at 110 ppm to 150 ppm of silver and at least 110 ppm of copper
   b) about 2 to about 7 tbsp. (34-119 g) of zeolite (the finest grind available)
   c) about 1 to about 5 tsp. (5-25 g) of activated carbon,
   d) optionally, from about 30 lbs. to about 75 lbs. (13.6-34 Kg) sodium bicarbonate; and
   e) ozone;
   which treatment eliminates, reduces or masks detection of the article,
   human or animal by IR, RF, X-ray, UV or EMI.

2. The method of claim 1, wherein the composition of comprises the following components:
   a) about 1 gallon (3.8 L) copper/silver water concentrate having at least 110 ppm of silver;
   b) about 4 tbsp. (60 g) of zeolite;
   c) about 2 tsp. (8 g) activated carbon;
   d) about 50 lbs. (22.7 Kg) sodium bicarbonate; and
   e) ozone.

3. The method of claim 1, wherein the amount of the components in the composition varies by about +10% by wt. and the relative ratios of each component to the other components remain constant within any variation.

4. The method of claim 2, wherein the amount of the components in the composition varies by about +10% by wt. and the relative ratios of each component to the other components remain constant within any variation.

5. The method of claim 2, wherein the copper/silver water has at least 110 ppm of silver and about 110 ppm copper.

6. The method of claim 1, wherein the composition has sodium bicarbonate present and is a dry powder.

7. The method of claim 1, wherein the composition has sodium bicarbonate.

8. The method of claim 1, wherein the object is coated with the composition and the object is not detectible or has reduced detection or is masked from detection by one or more of IR, RF, X-ray, UV and EMI.

9. The method of claim 8, wherein the method treats the object by applying the composition to the object as a powder or liquid using any means and optionally has an aqueous base material present to facilitate that application.

10. The method of claim 8, wherein the composition is applied by any means to any object as a powder, spray, or liquid resulting in coating the object in whole or a portion thereof.

11. The method of claim 8, wherein which composition is applied to such object by coating the object using spraying, dusting, painting, or immersing the object with the composition or applying the composition to the article by any means using drones or robots.

12. The method of claim 1 for eliminating, reducing or masking human detection by IR, RF, X-ray, UV or EMI or by blocking heat signatures from a person by treating one or more of the person's clothing, skin or equipment with the composition.

13. The method of claim 12, wherein the person applies the composition as a powder, spray, or liquid onto his/her clothes or skin or both where such composition can be a concentrate that has been added to a base material for application.

14. The method of claim 12, wherein the treated clothing is any outer garment worn, equipment being carried, and any exposed skin of the person.

15. The method of claim 12, wherein the human cannot be detected by an animal, drone, or heat sensing device.

16. A process for preparing a concentrate of claim 1 comprising:
   a) immersing silver rods and copper rods in DI water (1 gallon; 3.8 L) in a colloidal silver generating kit for 20-48 hours prior to use at about 27 volts, wherein after the generation the amount of silver in the DI water is at least 110 to 150 ppm and copper about 110 ppm;
   b) mixing zeolite (2-7 tbsp; 34-119 g) and activated carbon (1-5 tsp; 5-25 g) with stirring;
   c) adding the mixture from step b) to the copper/silver water of step a) with stirring;
   d) treating the mixture from step c) for about 25 minutes with ozone using an ozone generator; and
   e) adding 30-75 lbs. (13-34 Kg) of sodium bicarbonate to the liquid of step d) and mixing until dry;
   f) providing about 30-75 lbs. of the dry mixture concentrate.

17. The process of claim 16, wherein the silver rods are the cathode and copper rods are the anode.

18. The process of claim 17, wherein the copper is copper metal, brass, phosphorous bronze, beryllium copper or mixtures thereof.

19. A composition comprising:
   a) about 1 gallon (3.8 L) copper/silver water concentrated from 110 ppm to 150 ppm of silver
   b) about 2 to about 7 tbsp. (34-119 g) of zeolite (the finest grind available)
   c) about 1 to about 5 tsp. (5-25 g) of activated carbon,
   d) from about 30 lbs. to about 75 lbs. (13-34 Kg) sodium bicarbonate; and
   e) ozone.

* * * * *